United States Patent
Dundas et al.

(10) Patent No.: US 10,082,226 B1
(45) Date of Patent: *Sep. 25, 2018

(54) HOSE HOLDER SYSTEM AND RELATED METHODS

(71) Applicants: Robert D. Dundas, Glendale, AZ (US); Evan S. Dundas, Glendale, AZ (US)

(72) Inventors: Robert D. Dundas, Glendale, AZ (US); Evan S. Dundas, Glendale, AZ (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/655,743

(22) Filed: Jul. 20, 2017

Related U.S. Application Data

(63) Continuation of application No. 14/638,494, filed on Mar. 4, 2015, now Pat. No. 9,739,399.

(Continued)

(51) Int. Cl.
*F16L 3/20* (2006.01)
*E01C 23/00* (2006.01)
(Continued)

(52) U.S. Cl.
CPC ............... *F16L 3/20* (2013.01); *E01C 23/00* (2013.01); *E01C 23/14* (2013.01); *F16L 3/26* (2013.01)

(58) Field of Classification Search
CPC .......... E01C 23/00; E01C 23/14; E01C 19/48; F16L 3/20; F16L 3/26
See application file for complete search history.

(56) References Cited

U.S. PATENT DOCUMENTS

| 656,765 A | 8/1900 | Copeland |
| 2,597,482 A | 5/1952 | Harrison et al. |

(Continued)

FOREIGN PATENT DOCUMENTS

AU 2013101583 1/2014

OTHER PUBLICATIONS

"Hose Handling Slings," published online by Flytech Engineering Sdn. Bhd (FESB) of Malaysia at least as early Jan. 14, 2015, added to Flytech's catalog at least as early as Sep. 1, 2011, available at http://www.flytech.com.my/catalog/slings-p-304.html, last visited Feb. 19, 2015.

(Continued)

*Primary Examiner* — Abigail A Risic
(74) *Attorney, Agent, or Firm* — IPTechLaw

(57) ABSTRACT

A hose holder system includes a rigid holder having a substantially vertical section and a substantially horizontal section. A flexible sling movably couples with the substantially horizontal section and includes a first flap and a second flap. A hose couples with the rigid holder through the sling, the hose coupled between the first flap and second flap, the sling supporting a portion of the hose in a position substantially parallel with the substantially horizontal section of the rigid holder. A swiveling base is coupled with the rigid holder and includes an opening therethrough through which the hose passes substantially perpendicularly. In implementations the hose holder system is configured to allow the hose to contact no rigid element of the hose holder system between the opening and a dispenser during use. The hose may enter the sling at an about 90 degree angle and exit at an about 30-35 degree angle.

19 Claims, 9 Drawing Sheets

Related U.S. Application Data

(60) Provisional application No. 61/947,882, filed on Mar. 4, 2014.

(51) Int. Cl.
*F16L 3/26* (2006.01)
*E01C 23/14* (2006.01)

(56) References Cited

U.S. PATENT DOCUMENTS

| | | |
|---|---|---|
| 3,265,087 A | 8/1966 | Livingston |
| 3,290,083 A | 12/1966 | Norton |
| 3,527,485 A | 9/1970 | Goward et al. |
| 3,735,928 A | 5/1973 | Watts et al. |
| 3,773,087 A | 11/1973 | Katayama |
| 3,822,074 A | 7/1974 | Welcker |
| 3,829,136 A | 8/1974 | Eidelberg |
| 3,860,274 A | 1/1975 | Ledstrom et al. |
| 3,973,791 A | 8/1976 | Porta et al. |
| 4,151,688 A | 5/1979 | Flynn |
| 4,243,253 A | 1/1981 | Rogers, Jr. |
| 4,260,184 A | 4/1981 | Greenawalt et al. |
| 4,289,339 A | 9/1981 | Hansen |
| 4,367,967 A | 1/1983 | Albert, Jr. |
| 4,431,218 A | 2/1984 | Paul, Jr. et al. |
| 4,455,474 A | 6/1984 | Jameson et al. |
| 4,553,023 A | 11/1985 | Jameson et al. |
| 4,643,229 A | 2/1987 | Hickin |
| 4,805,933 A | 2/1989 | Swisher |
| 4,820,078 A | 4/1989 | Brocious |
| 4,923,350 A | 5/1990 | Hinksman et al. |
| 5,022,459 A | 6/1991 | Chiles et al. |
| 5,182,147 A | 1/1993 | Davis |
| 5,263,790 A | 11/1993 | Bickley et al. |
| 5,316,348 A | 5/1994 | Franklin |
| 5,334,064 A | 8/1994 | Ketterman et al. |
| 5,367,925 A | 11/1994 | Gasparre |
| 5,381,511 A | 1/1995 | Bahar et al. |
| 5,428,706 A | 6/1995 | Lequeux |
| 5,600,752 A | 2/1997 | Lopatinsky |
| 5,698,278 A | 12/1997 | Emond et al. |
| 5,713,864 A | 2/1998 | Verkaart |
| 5,816,622 A | 10/1998 | Carter |
| 5,832,178 A | 11/1998 | Schave |
| 5,857,711 A | 1/1999 | Comin-DuMong et al. |
| 5,862,303 A | 1/1999 | Adar et al. |
| 5,863,079 A | 1/1999 | Donais et al. |
| 5,928,746 A * | 7/1999 | Dalton ............... B29C 47/0014 428/375 |
| 5,964,483 A | 10/1999 | Long et al. |
| 6,043,466 A | 3/2000 | Jenko et al. |
| 6,049,658 A | 4/2000 | Schave et al. |
| 6,109,826 A | 8/2000 | Mertes |
| 6,148,147 A | 11/2000 | Durham |
| 6,182,347 B1 | 2/2001 | Reed et al. |
| 6,494,495 B1 | 12/2002 | Cunningham |
| 6,612,619 B2 | 9/2003 | Wieder |
| 6,634,677 B2 | 10/2003 | Mehr |
| 6,908,119 B2 | 6/2005 | Murken |
| 8,210,770 B2 | 7/2012 | Halvorson |
| 2009/0274515 A1 | 11/2009 | Cooper et al. |

OTHER PUBLICATIONS

2015 KERA Melting Kettles, published online by Midstates Equipment & Supply at least as early as Jan. 14, 2015, available at http://www.midstatesequipment.net/supply/new-equipment/2012-kera-melting-kettle/, last visited Feb. 19, 2015.

Hose Support 2012, published online at least as early as Dec. 17, 2012 by Flytech Engineering Sdn. Bhd (FESB), available online at http://www.flytech.com.my/product/hose-handling-sling-coupling-accessories-supplier-composite-hose-malaysia?filter_name=sling under the "Downloads" tab, last visited Feb. 19, 2015.

2012 KERA Melting Kettles, published online by Midstates Equipment & Supply at least as early as Oct. 13, 2013, available online at http://web.archive.org/web/20131013152211/http://midstatesequipment.net/supply/new-equipment/2012-kera-melting-kettle/, last visited Feb. 19, 2015.

* cited by examiner

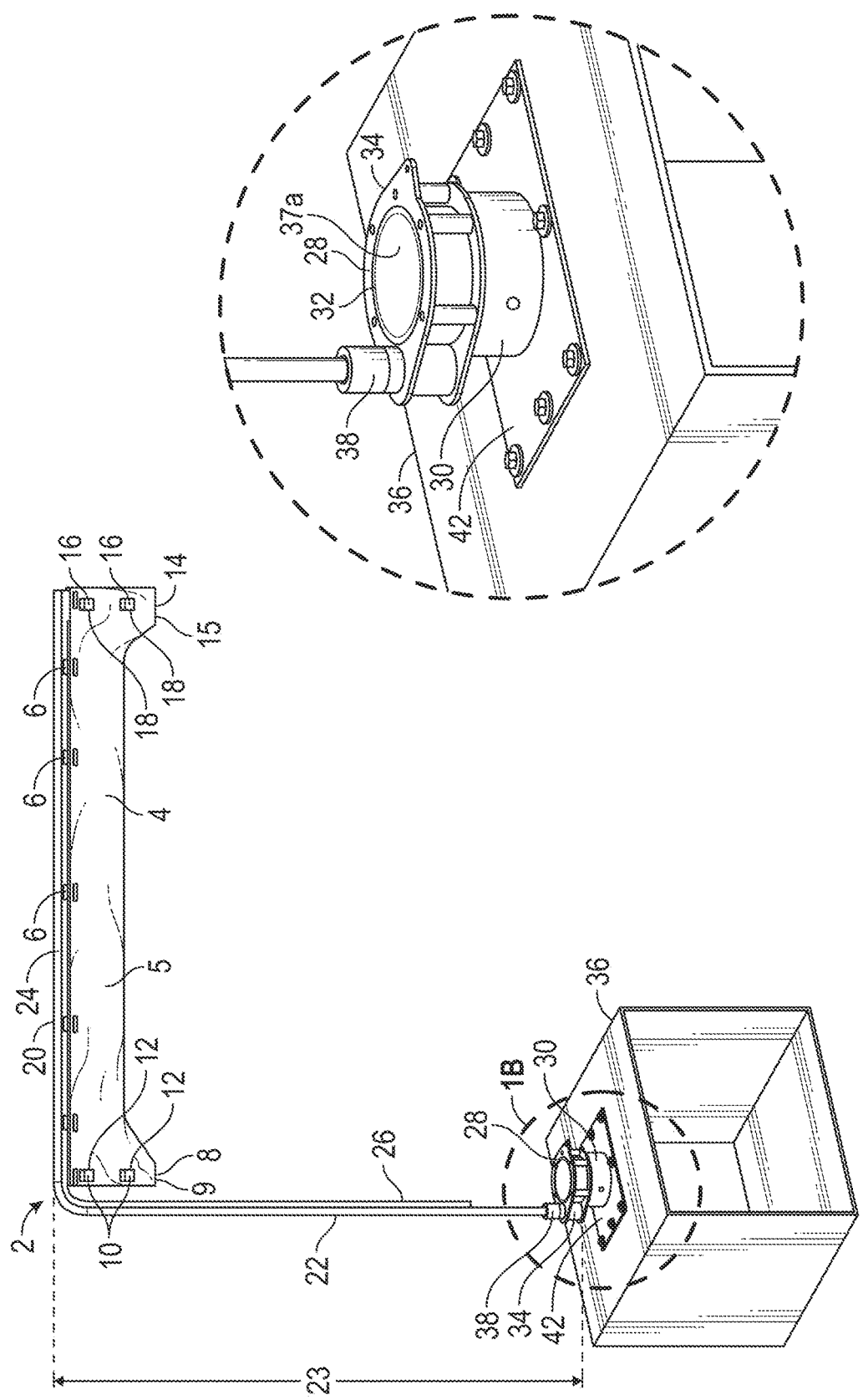

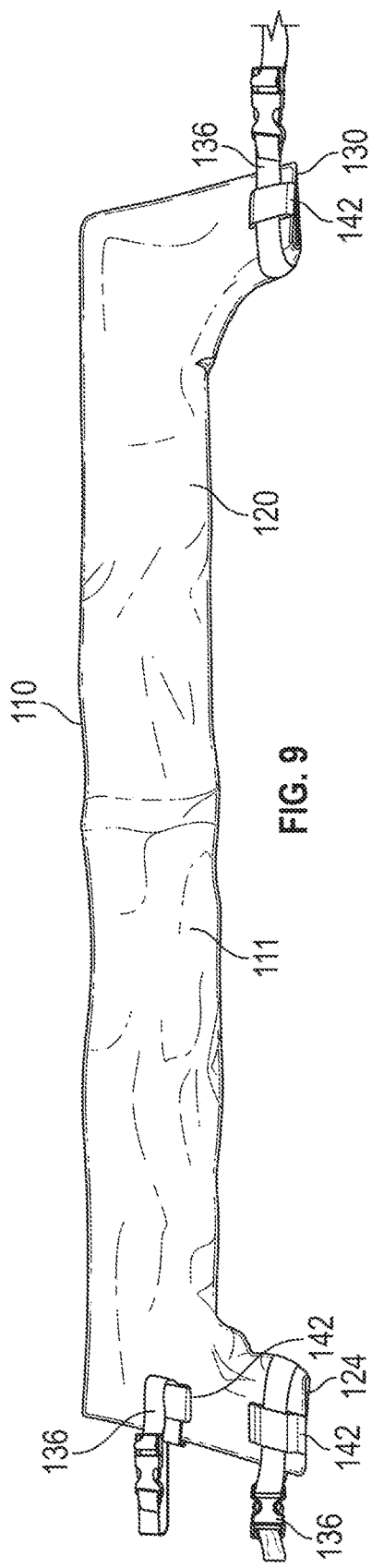
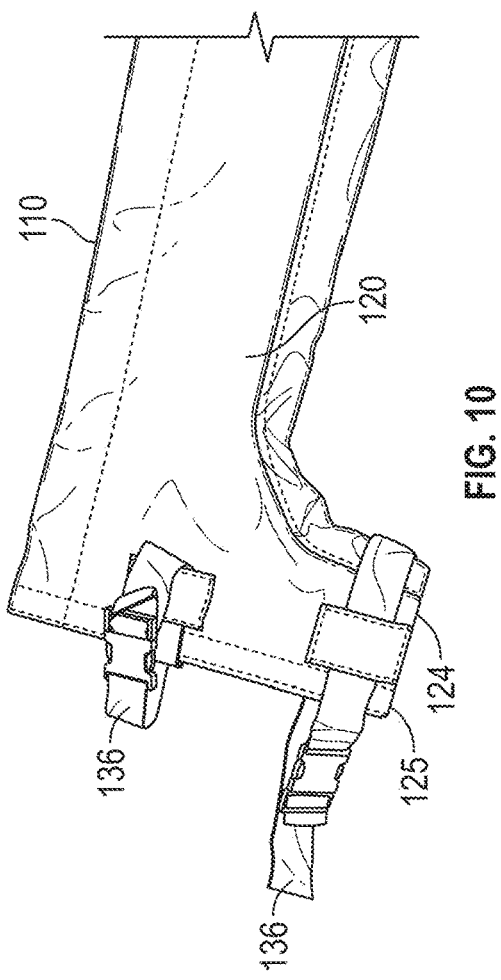

HOSE HOLDER SYSTEM AND RELATED METHODS

CROSS REFERENCE TO RELATED APPLICATIONS

This application is a continuation application of the earlier U.S. Utility Patent Application to Robert D. Dundas entitled "Hose Holder System and Related Methods," application Ser. No. 14/638494, filed Mar. 4, 2015, now pending, which application claims the benefit of the filing date of U.S. Provisional Patent Application assigned Ser. No. 61/947,882, entitled "Hose Holder System and Related Methods," naming as first inventor Robert D. Dundas, which was filed on Mar. 4, 2014, the disclosures of each which are hereby incorporated entirely herein by reference.

BACKGROUND

1. Technical Field

Aspects of this document relate generally to hose systems used to convey heated liquids. Aspects of this document also relate generally to carrying elements used to carry or hold a portion of a hose. Specific implementations relate to hose systems having carrying elements used to carry or hold a portion of a hose while the hose conveys a heated liquid.

2. Background Art

Hose systems exist for the conveyance of liquids and other items. Some hose systems are used to convey heated liquids and include thermal insulation in order to keep a heated liquid within the hose at a desired temperature prior to or upon exiting the hose and/or to prevent damage or injury to a user or other items that come in contact with the hose when the heated liquid is therein. Other hose systems include one or more heating elements, such as resistive electrical components, in order to heat the liquid or to keep it at a desired temperature prior to or upon exiting the hose. Carrying elements are used to elevate and/or hold a hose or a portion of a hose during use and/or during storage.

SUMMARY

Implementations of hose holder systems may include: a rigid holder having a substantially vertical section and a substantially horizontal section; a sling movably coupled with the substantially horizontal section and having a first flap and a second flap; a hose coupled with the rigid holder through the sling, the hose coupled between the first flap and the second flap, the sling supporting a portion of the hose in a position substantially parallel with the substantially horizontal section of the rigid holder, and; a swiveling base coupled with the rigid holder and having an opening therethrough, the rigid holder coupled adjacent to an edge of the opening; wherein the hose is configured to extend through the opening.

Implementations of hose holder systems may include one, all, or any of the following:

The substantially vertical section of the rigid holder may be coupled with the swiveling base through a cylindrical cavity adjacent to the opening, and an axis of the cylindrical cavity may be substantially perpendicular to the opening.

The rigid holder may be rotatable through the swiveling base about an axis perpendicular to, and passing through, the opening, which axis may not be collinear with a longest length of the substantially vertical section.

The hose may extend through the opening substantially perpendicularly to the opening.

The hose may enter the sling at an angle (entrance angle) between about 80 and about 100 degrees and may be configured to exit the sling at an angle (exit angle) between about 25 and about 45 degrees.

The sling may include an adjuster configured to adjust a size of one of an entrance opening of the sling where the hose enters the sling and an exit opening of the sling where the hose exits the sling.

Implementations of hose holder systems may include: a wheeled vehicle having a melter configured to melt a crack repair material; a hose coupled with the melter through an attachment point and configured to convey the melted crack repair material; a dispenser coupled with an end of the hose and configured to dispense the melted crack repair material into a crack, and; a sling formed of a flexible material, the sling holding a portion of the hose in a position substantially parallel with a ground upon which the wheeled vehicle is resting.

Implementations of hose holder systems may include one, all, or any of the following:

The sling may be coupled with a rigid holder having a substantially horizontal section and a substantially vertical section.

The sling may be movably coupled with the substantially horizontal section through a plurality of couplers.

The rigid holder may be rotatable through a swiveling base, wherein the hose extends towards the substantially horizontal section through an opening in the swiveling base, and wherein the substantially vertical section of the rigid holder has a longest length defining an axis that does not pass through the opening.

The hose may enter the sling at an angle (entrance angle) between about 75 and about 105 degrees and may exit the sling at an angle (exit angle) between about 20 and about 50 degrees.

The sling may include an adjuster configured to adjust a size of one of an entrance opening of the sling where the hose enters the sling and an exit opening of the sling where the hose exits the sling.

The sling may include a support member including a rigid rod.

The sling may include a pair of flexible flaps.

The hose holder system may include no rigid element that contacts the hose between the opening and the dispenser.

Implementations of hose holder systems may include: a wheeled vehicle having a melter configured to melt a crack repair material; a rigid holder coupled with the wheeled vehicle and having one or more coupler receivers; a sling having a first flap and a second flap, each flap having multiple attachment points whereat couplers are attached, the attachment points of the first flap aligning with the attachment points of the second flap, and; a hose coupled with the wheeled vehicle and configured to convey the melted crack repair material; wherein the sling is configured to hold a portion of the hose between the first flap and the second flap when the couplers of the first flap and the second flap are coupled with the one or more coupler receivers.

Implementations of hose holder systems may include one, all, or any of the following:

The rigid holder may be rotatable relative to the wheeled vehicle through a swiveling base.

The hose may bend at an about 90 degree angle where the hose enters the sling and the hose holder system may be configured to allow the hose to bend at an about 30-35 degree angle where the hose exits the sling.

An entrance adjuster may be included and configured to adjust a size of an entrance opening of the sling where the hose enters the sling and an exit adjuster may be included and configured to adjust a size of an exit opening of the sling where the hose exits the sling.

The hose may extend through an opening in a base, the base coupling the rigid holder with the wheeled vehicle, and the hose holder system may be configured to prevent the hose from contacting any portion of the hose holder system between the opening and the dispenser, except the sling, during use.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 1A is a perspective view of an implementation of a hose holder system;

FIG. 1B is a close-up view of a portion of the hose holder system of FIG. 1A;

FIG. 9 is a side view of an implementation of a sling of a hose holder system;

FIG. 10 is a close-up view of a portion of the sling of FIG. 9;

DESCRIPTION

Figure 2A:
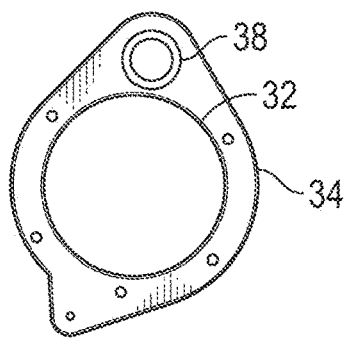
FIG. 2A is a top view of a swiveling member of a swiveling base of the hose holder system of FIG. 1A.
Figure 2B:
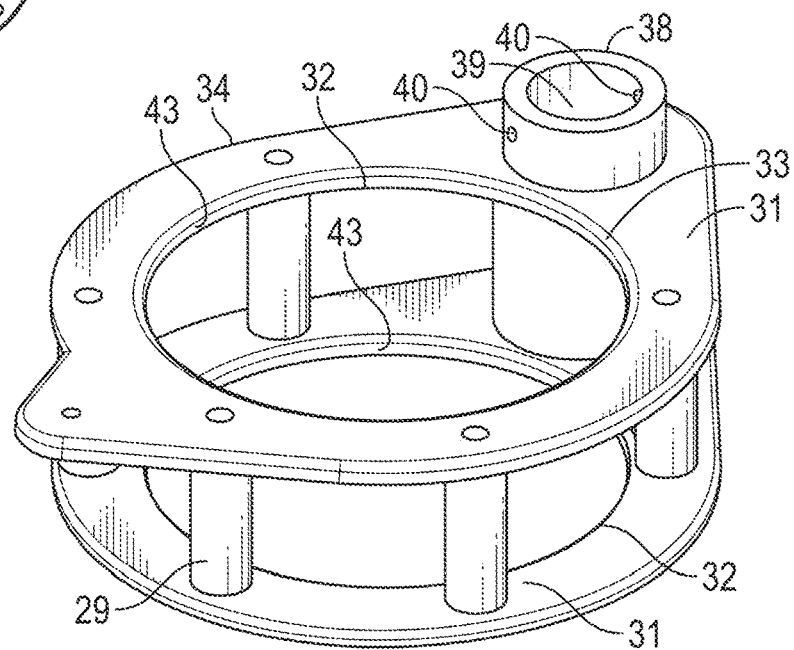
FIG. 2B is a perspective view of the swiveling member of FIG. 2A.
Figure 3:
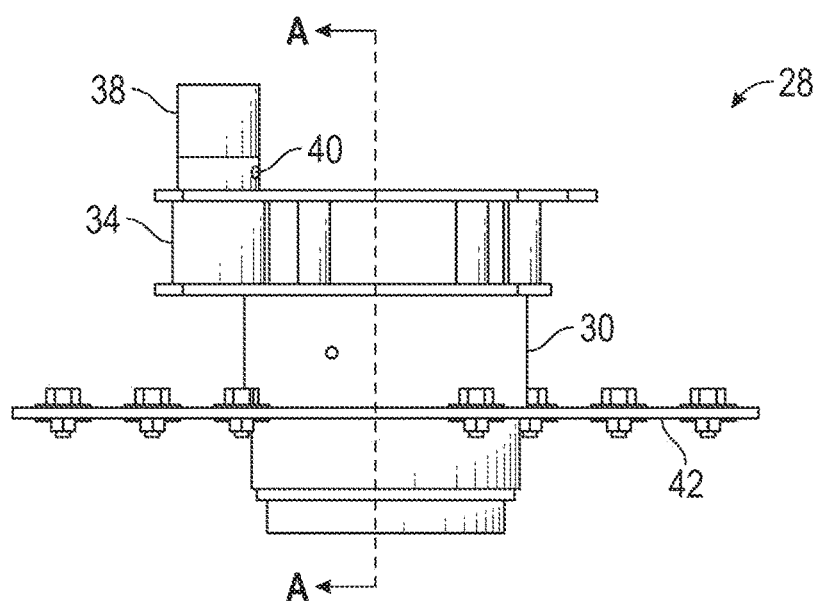
FIG. 3 is a side view of a swiveling base of the hose holder system of FIG. 1A.

This disclosure, its aspects and implementations, are not limited to the specific components, assembly procedures or method elements disclosed herein. Many additional components, assembly procedures and/or method elements known in the art consistent with the intended hose holder systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such hose holder systems and related methods, and implementing components and methods, consistent with the intended operation and methods.

Hose holder systems and elements thereof disclosed herein may include any of the elements, sub-elements, characteristics, features, details, and the like of elements disclosed in the following U.S. patents and patent applications, each of which is hereby entirely incorporated herein by reference: U.S. Pat. No. 7,266,293, issued Sep. 4, 2007, titled "Hose for Hot Liquids Having Heating Element," naming as first inventor Robert D. Dundas; U.S. Pat. No. 7,168,451, issued Jan. 30, 2007, titled "Removable Hose Cover," naming as first inventor Robert D. Dundas; and; U.S. Pat. App. Ser. No. 14/590,498, filed Jan. 6, 2015, titled "Hose and Flare System and Related Methods," naming as first inventor Robert D. Dundas.

Referring now to FIGS. 1A-4, in various implementations a hose holder system 2 includes a sling 4 formed of a flexible material 5 and coupled to a rigid holder (boom) 20 through a plurality of couplers 6. The couplers 6 in this implementation may include, by non-limiting example, straps, loops, clips, rings, and the like, that are used to couple the sling to the rigid holder. The sling is movably coupled to the rigid holder in that it is able to swing about an axis collinear with a longest length of a substantially horizontal section 24 of the rigid holder due to the flexible nature of the sling and/or due to the configuration of couplers 6 used, and is also allowed some movement in a transverse direction parallel with the longest length of the substantially horizontal section 24.

The sling 4 includes an entrance opening 8 which includes a slit 9 where a hose enters the sling and an exit opening 14 which includes a slit 15 where a hose exits the sling. The hose is not shown in FIGS. 1A-4, but the reader may envision the position of the hose by referencing other implementations of hose holder systems illustrated in FIGS. 6, 14 and 15. An adjuster (entrance adjuster) 10 is included proximate the entrance opening and is configured to adjust a size of the entrance opening and/or to tighten the entrance opening around the hose. An adjuster (exit adjuster) 16 is included proximate the exit opening and is configured to adjust a size of the exit opening and/or to tighten the exit opening around the hose. The entrance adjusters and exit adjusters shown in FIG. 1A include hook and loop fasteners 12 and 18, though in other implementations they could include snaps, buttons, zippers, magnets, and the like.

The rigid holder 20 includes a substantially vertical section 22 coupled with the substantially horizontal section 24. A reinforcement member 26 may be included, which in the implementation shown is a rigid rod, and may provide added rigidity to the rigid holder. The rigid holder itself may be formed of a rigid rod, such as a metallic, plastic, or composite rod.

A swiveling base 28 is coupled with the substantially vertical section of the rigid holder and provides a mechanism whereby the rigid holder may rotate. An opening 32 is included in the swiveling base and a hose passes upwards through the opening towards the entrance opening 8, then through the sling 4 and out of the exit opening 14. The sling 4 thus supports a portion of the hose in a substantially horizontal position or, in other words, a position that is substantially parallel with the substantially horizontal section 24 of the rigid holder 20.

Figure 4:
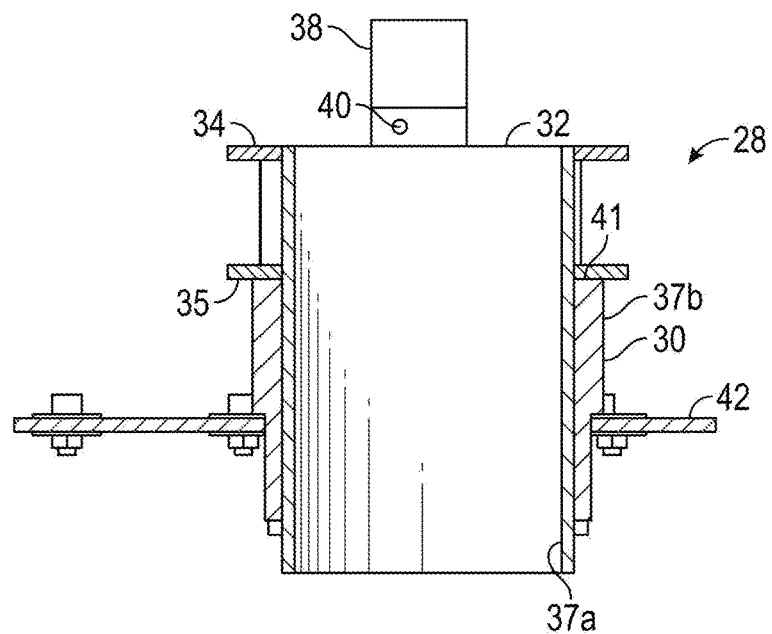
FIG. 4 is a cross-section view of the swiveling base of FIG. 3 taken along plane A-A.

The swiveling base 28 in the implementations shown includes a stationary section 30 that is coupled to a container 36 with a coupler 42, and a swiveling member 34 coupled in a swiveling manner with the stationary section. The components of the swiveling base are shown up close in FIG. 1B, and other views are shown in FIGS. 2A-4. Referring to FIG. 4, which is a cross-section view of FIG. 3 taken along plane A-A, and to FIGS. 2A and 2B it may be seen that the swiveling member 34 includes a pair of thin flat members 31 each having an opening 32, the two openings 32 aligned and the thin flat members 31 spaced apart using spacers 29.

Stationary section 30 includes an inner cylinder 37*a* and an outer cylinder 37*b* that are concentric. In implementations the two cylinders may be coupled together such as, by non-limiting example, using a weld, an adhesive, or the like. In various implementations, the cylinders could be integrally formed when the stationary section is formed. In other implementations, the cylinders do not move with respect to one another but instead provide surfaces for the swiveling member 34 to swivel relative to the stationary section 30. A bottom surface 35 of the lowermost thin flat member 31 rests atop a ledge (flange) 41 defined by an end of outer cylinder 37*b*, and inner surfaces 43 of the thin flat members 31, which define the openings 32, align the two openings 32 such that they are concentric with an axis of the inner cylinder 37*a*. The configurations described in this paragraph may provide for the swiveling member to have a small amount of surface area that contacts directly with the stationary member, i.e., just the inner surfaces 43 and bottom surface 35, which may reduce overall friction and allow for the swiveling member to swivel more easily with respect to the stationary member. A lubricant such as a grease or oil may be placed between the swiveling member and stationary section to further reduce friction and increase the ease with which the swiveling member may be swiveled.

In an alternative configuration of a swiveling base, the inner cylinder 37*a* and outer cylinder 37*b* may not be coupled to one another fixedly but the inner cylinder may be instead fixedly secured to the swiveling member 34 and the stationary section may accordingly not include the inner cylinder, but will still include the outer cylinder, while the inner cylinder is included in the swiveling member. The swiveling of the swiveling member in this implementation may be accomplished by the inner cylinder rotating relative to the outer cylinder while the bottom surface 35 of the lowermost thin flat member 31 rests atop ledge (flange) 41 defined by the outer cylinder 37*b*. A lubricant may be provided, such as a grease, oil or other material, between the inner cylinder and outer cylinder and/or between the bottom surface 35 and the ledge (flange) 41, to increase the ease with which the swiveling member swivels relative to the stationary section.

Figure 5:
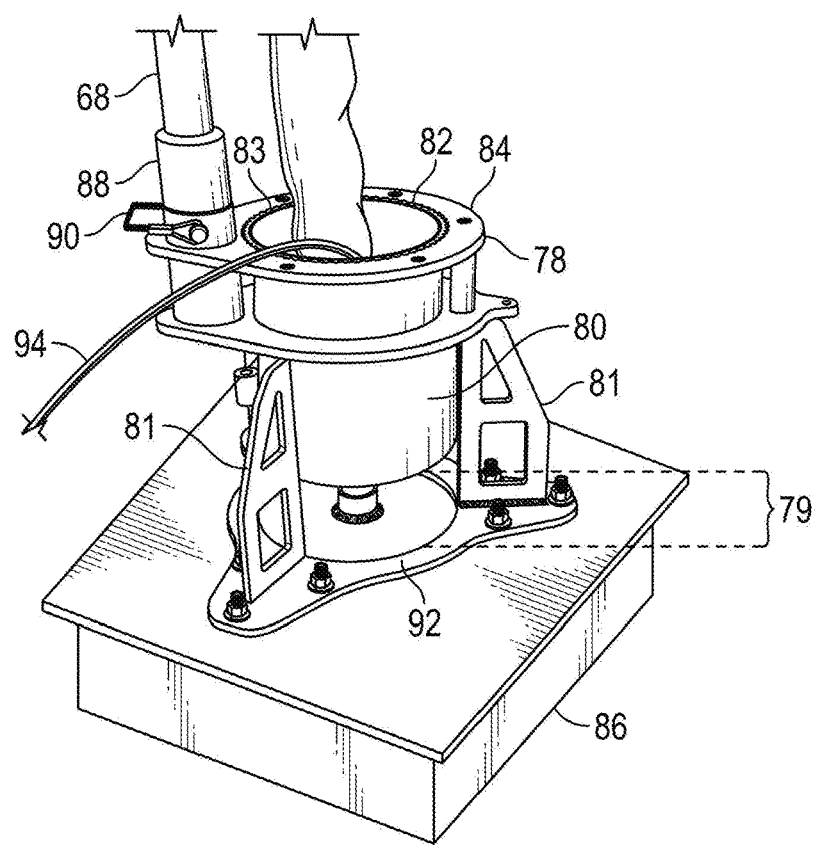
FIG. 5 is a close-up view of a portion of the hose holder system of FIG. 6.

Referring still to FIGS. 1A-4, the substantially vertical section of the rigid holder couples with the swiveling member 34 through a coupler 38. The coupler 38 defines a cylindrical cavity 39 within which the substantially vertical section, which in the implementation shown is a cylindrical rod, may be inserted. The substantially vertical section includes a through-hole proximate its lower end which is aligned with the pin receivers 40 of the coupler 38, and a pin similar to pin 90 (shown in FIG. 5 with respect to another implementation of a hose holder system) is placed through the pin receivers 40 and the through-hole of the substantially vertical section to secure the rigid holder to the swiveling member 34. As can be seen in FIG. 5, the pin may be an easily removable pin such that it may be removed and the rigid holder thus removed from the cylindrical cavity 39 as desired.

As can be seen from FIGS. 1A-4, the cylindrical cavity 39 defines an axis that is collinear with an axis defined by a longest length of the substantially vertical section. The coupler 38 is offset from the upper opening 32 such that it is adjacent to an edge 33 of the upper opening 32. The upper opening 32 and lower opening 32 (referring to FIG. 2B) define a cylindrical cavity which receives inner cylinder 37*a*. The inner cylinder 37*a* and the upper opening 32 and lower opening 32 thus are concentric about a common axis, this common axis being parallel with, but not collinear with (or, in other words, the cylinder is offset from) the common axis of the cylindrical cavity 39, coupler 38 and longest length of the substantially vertical section 22 of the rigid holder. Thus, when the substantially horizontal section 24 of the rigid holder is swayed/pushed from side to side, the rigid holder rotates to allow this swaying, but the rigid holder rotates not about the common axis of the cylindrical cavity 39, coupler 38 and longest length 23 of the substantially vertical section, but instead about the common axis of the inner cylinder 37*a*, outer cylinder 37*b*, and upper and lower openings 32.

Providing for the coupler 38 to be offset from the upper opening 32 allows for the rigid holder to be coupled to the swiveling member 34 without obstructing the hose, thus the hose may pass upwards through the upper opening 32 and through the inner and outer cylinders towards the sling without contacting, or being obstructed by, the substantially vertical member. In various implementations, the hose does not ever come in contact with the rigid holder at all.

The container 36 shown in FIG. 1A is shown with two open sides, though this is for illustration purposes only, illustrating that the container is hollow and has a volume therein for holding a fluid which will be conveyed by the hose. Naturally when the container is filled with a fluid it will be enclosed on all sides to contain the fluid therein. In implementations the container may hold a melted crack material 100 which is used to repair a crack in a surface, such as a crack in an asphalt surface, and accordingly any of the hose holder systems disclosed herein may be implemented together with, or may be included in, a crack repair system such as the crack repair system 96 of FIG. 15 which includes a wheeled vehicle 98 having a crack repair material 100 which is melted using a melter 104 and then is conveyed through the hose 64 via the attachment point 66 and then dispensed to fill a crack 103 using a dispenser 102 that is coupled to an end 65 of the hose 64. Such a system may accordingly include heating elements, stirring elements within the melter to help keep the melted crack repair material at an appropriate consistency, a pump to pump the melted crack repair material from the melter through the hose, and the like. The dispenser may have a trigger, button or other selector to allow a user to selectively dispense the crack repair material when desired and to stop the flow when desired. It may be seen in FIG. 15 that a portion of the hose is held, by the sling, in a position that is substantially horizontal or, in other words, substantially parallel with a ground 105 upon which the wheeled vehicle 98 rests, and also substantially parallel with the substantially horizontal section of the rigid holder.

Referring to FIGS. 5-8 and 15, in implementations a hose holder system 44 has some similarities and some differences compared to hose holder system 2. The swiveling base 78 is similar to swiveling base 28 except that with swiveling base 28 the inner cylinder 37a and outer cylinder 37b extend through the top of the container whereas, with swiveling base 78, both cylinders are situated above the top of container 86, held up by risers 81 which couple to the outer cylinder, forming a gap 79 between the top of the container 86 and the lowermost portion of the lowermost cylinder. The risers are coupled with the coupler 92 which secures the stationary section 80 relative to the container 86. As the hose may be an electrically heated hose, there may be sufficient space provided within the inner cylinder for a power cord 94 to extend therethrough to power the electrical heating elements of the hose.

The gap 79 in implementations is useful for, among other things, allowing a user to access an attachment point 66 where the hose 64 couples with the container 86 from the side through gap 79 instead of through opening 82, where the hose exits and may obstruct the user. This may allow for easy attachment of the hose to, and removal of the hose from, the container 86. Thus a hose may be easily installed and/or replaced with another hose during use, and or removed for maintenance, and the like, without difficulty. The hose holder system may also be disassembled to a more compact storage configuration, as may be imagined, by decoupling the hose from the attachment point and additionally removing the substantially vertical section from the coupler 88, after which the rigid holder, hose, and other elements could be laid flat or otherwise stored in a compact configuration while the wheeled vehicle 98 is moved between locations. The hose holder system 44 (or other hose holder systems disclosed herein) may also be retrofit onto an existing wheeled vehicle by adding the elements shown in FIG. 6 (or the other figures) to an existing container 86 (or other container) coupled with a wheeled vehicle.

As described herein, the container 86, as with other containers disclosed herein, may be a tank used to hold a heated liquid, such as a melted crack repair liquid, or the like. Container 86 may therefore be heated, or may be a holding tank used to hold a material that has previously been heated and/or melted in another tank or component of a crack repair system.

Swiveling base 78 includes an opening 82 and the coupler 88, which couples rigid holder 68 to the swiveling member 84, is situated adjacent to an edge 83 of opening 82 and includes a cylindrical cavity into which the substantially vertical section 70 is inserted and locked into place using pin 90 which operates together with a pin receiver similar to pin receiver 40 and a through hole in the substantially vertical section. The hose 64 may be seen in FIGS. 5 and 6 extending upwards through opening 82 in a manner such that the hose is substantially perpendicular relative to the opening and such that the hose does not contact, or is not obstructed by, the substantially vertical section 70 of the rigid holder 68. The axis defined by the longest length 71 of the substantially vertical section 70, which is also a common axis of the coupler 88 and cylindrical cavity, is parallel with, but not collinear with (or, in other words, is offset from) an axis defined by a central axis of the inner cylinder, which is an axis about which the opening 32 is centered and which is perpendicular to the opening 32. When the substantially horizontal section 72 of the rigid holder 68 is swayed from side to side the rigid holder rotates about the axis of the inner cylinder and the opening, and not the axis defined by the longest length of the substantially vertical section.

Figure 6:
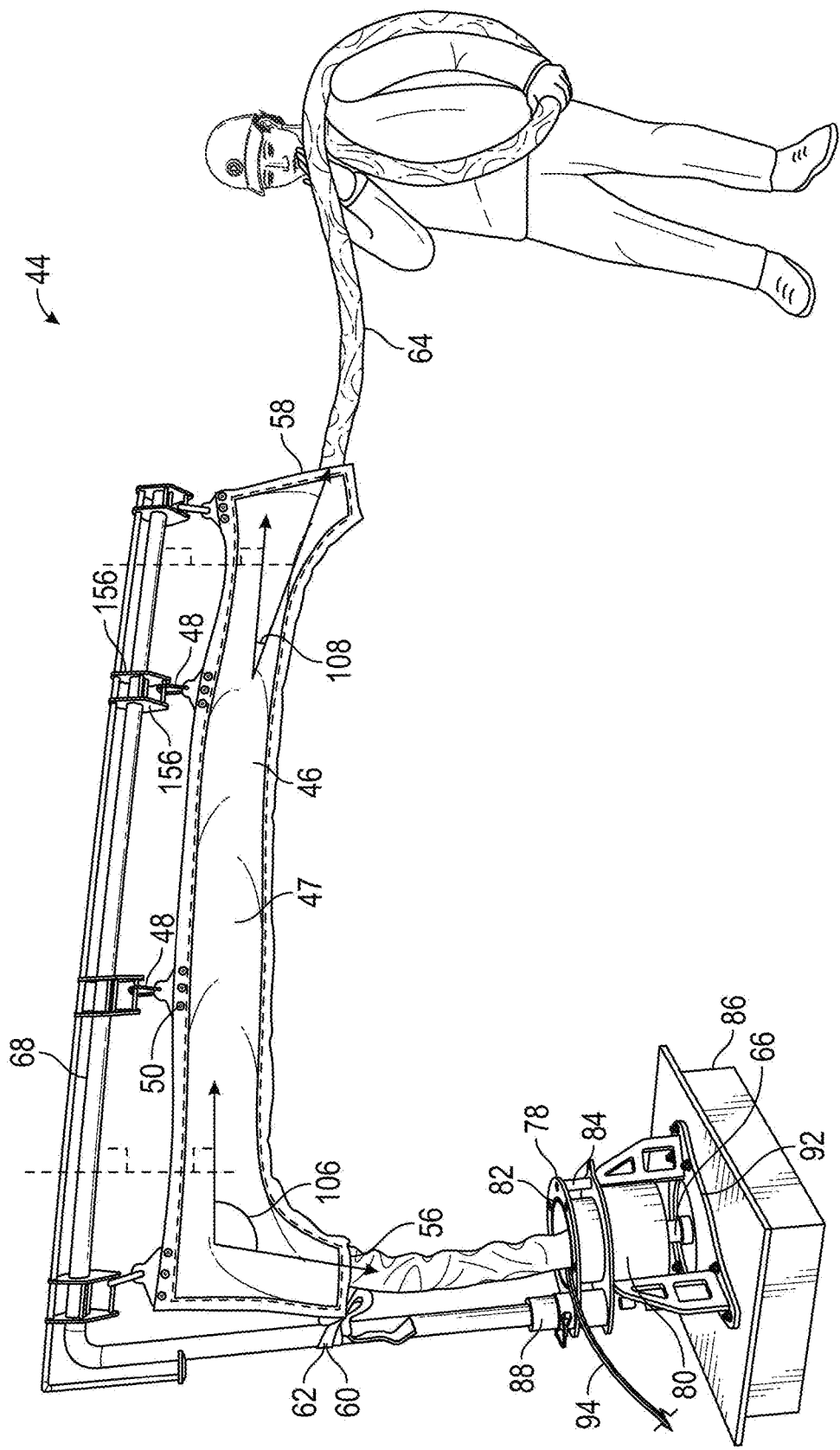
FIG. 6 is a perspective view of an implementation of a hose holder system.

Referring to FIG. 6, after the hose exits through the opening 82 it extends upwards in a substantially vertical direction and then enters the sling and bends to form an entrance angle 106. The entrance angle in implementations is: between about 75 and about 105 degrees; between about 80 and about 100 degrees; about 90 degrees, and; 90 degrees. The hose passes through the sling in a substantially horizontal, or horizontal, position, substantially parallel with, or parallel with, the substantially horizontal section, until it exits the sling. Where the hose exits the sling it bends to form an exit angle 108. The exit angle 108 in implementations is: between about 20 and about 50 degrees; between about 25 and about 45 degrees; about 30-35 degrees; about 30 degrees; about 35 degrees; 30 degrees, and; 35 degrees.

These entrance angles may in various implementations be defined as an angle between a portion of the hose immediately below the sling (or in other words prior to entering the sling) and the longest straight portion of the hose within the sling. The exit angle may in implementations be defined as an angle between the longest straight portion of the hose within the sling and a portion of the hose immediately after exiting the sling. An exit angle of about 30-35 degrees, or about 30 degrees, or about 35 degrees, or 30 degrees, or 35 degrees, may provide a better weight distribution of the hose within the sling and may allow for a more fluid sweep of the hose as it is being used or, in other words, easier rotation of the hose holder system through the swiveling base, while the hose is being moved from place to place to fill cracks using the dispenser. The entrance angles and exit angles described herein may be accomplished with any of the hose holder systems disclosed herein.

As is described herein, the rigid holder 68 rotates, through the swiveling base 78, about an axis that is collinear with an axis of the inner cylinder of the swiveling base 78. In effect, this means that the rigid holder 68 rotates about the vertical portion of the hose, as the vertical portion of the hose between the opening 82 and the entrance opening 56 is, or is about, collinear with this axis. Thus, in implementations in which the hose is coupled to the attachment point 66 in a non-swiveling manner the hose will twist as the rigid holder is rotated using the swiveling member 84. In various implementations, a swiveling mechanism may be used at the attachment point 66 so that the hose does not twist during rotation of the rigid holder 68, though in implementations in which there is twisting the twisting may be minimal and may not noticeably affect a flow of the fluid being conveyed through the hose.

Referring still to FIGS. 5-8 and 15, sling 46 is formed of a flexible material 47. As with other slings disclosed herein, the flexible material may be, by non-limiting example: a woven cloth; a polymer; a heat-resistant polymer; or the like. The sling 46 includes a first flap 52, which is a flexible flap 53, and a second flap 54, which is a flexible flap 55. The flaps are symmetric in the implementations shown and are joined together along a center 51. There are slits 57 and 59 which partially define the entrance opening 56 and exit opening 58, respectively.

Couplers 48 are coupled with the sling 46 at attachment points 50 and are used to hang the sling from the substantially horizontal section by coupling the couplers 48 with coupler receivers 76 of the substantially horizontal section 72. The couplers 48 may be designed so as to be easily coupled to, and decoupled from, the coupler receivers 76, such as by using easily removable fasteners such as spring rings, lobster clasps, bayonet clasps, barrel clasps, toggle clasps, s-hook couplers, magnetic couplers, hook and loop fasteners, or any other type of clasps or couplers, or the like.

In other implementations the sling could include grommets and the coupler receivers could include hooks or pins to hang the grommets on, or ties could be threated through the grommets and used to removably secure the sling to the substantially horizontal section, and so forth. Other coupling mechanisms could be used.

Figure 7:
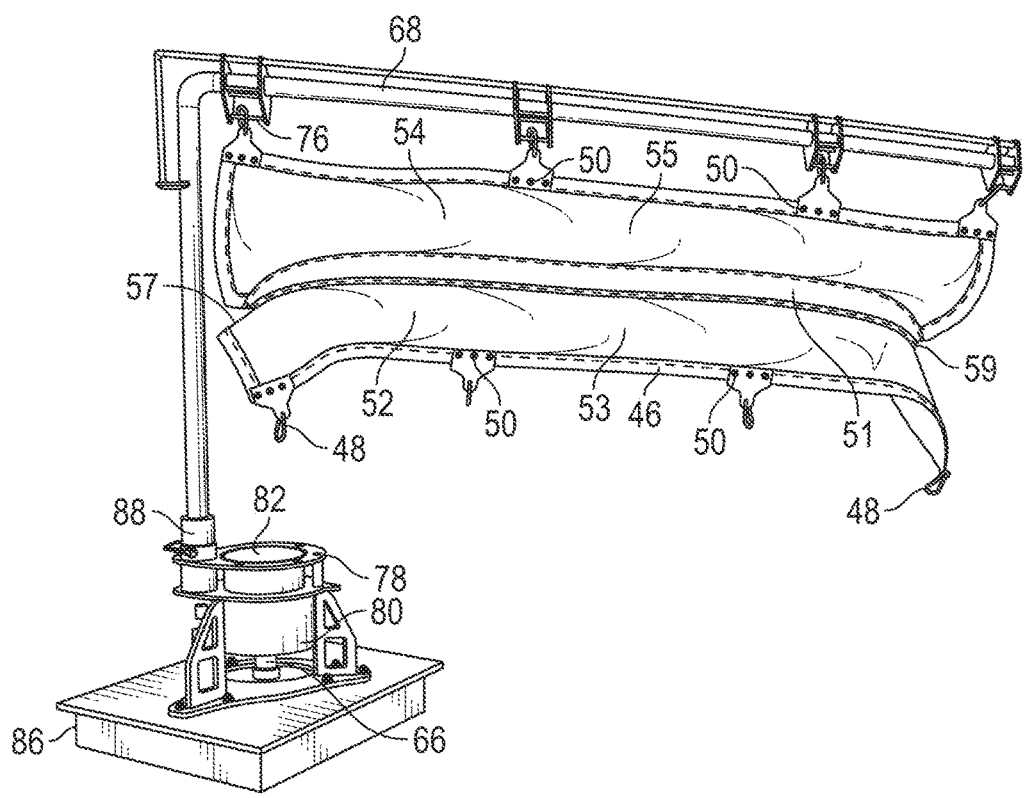
FIG. 7 is a perspective view of portions of the hose holder system of FIG. 6 with a sling of the hose holder system in an open configuration.
Figure 8:
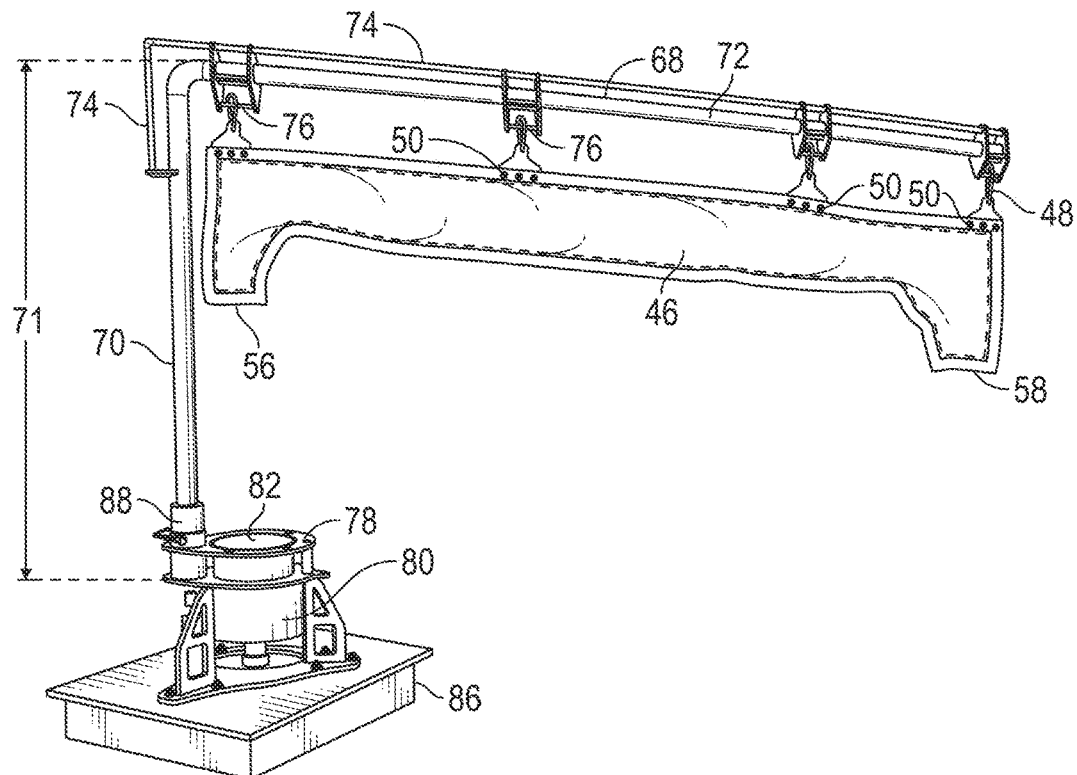
FIG. 8 is a perspective view of portions of the hose holder system of FIG. 6 with a sling of the hose holder system in a closed configuration.
Figure 11:
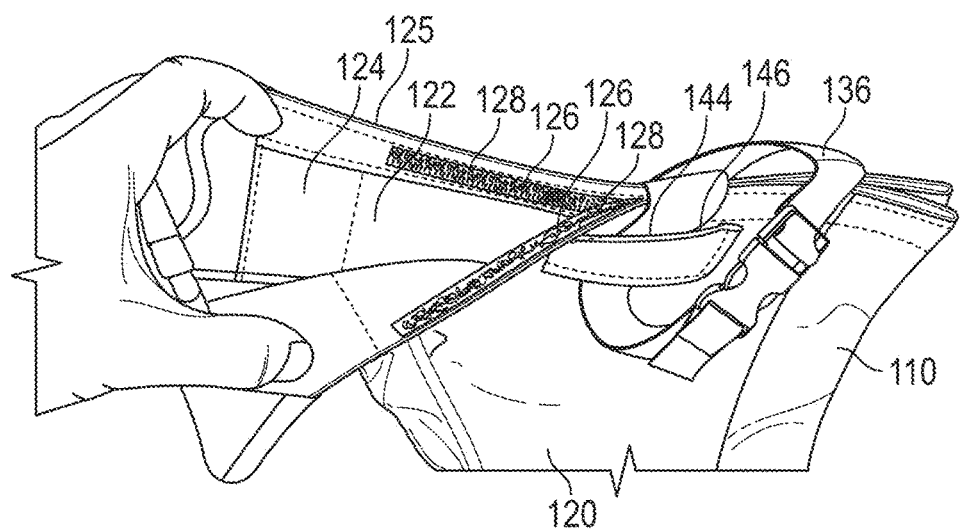
FIG. 11 is a close-up view of the portion of FIG. 10 being opened by a user.
Figure 12:
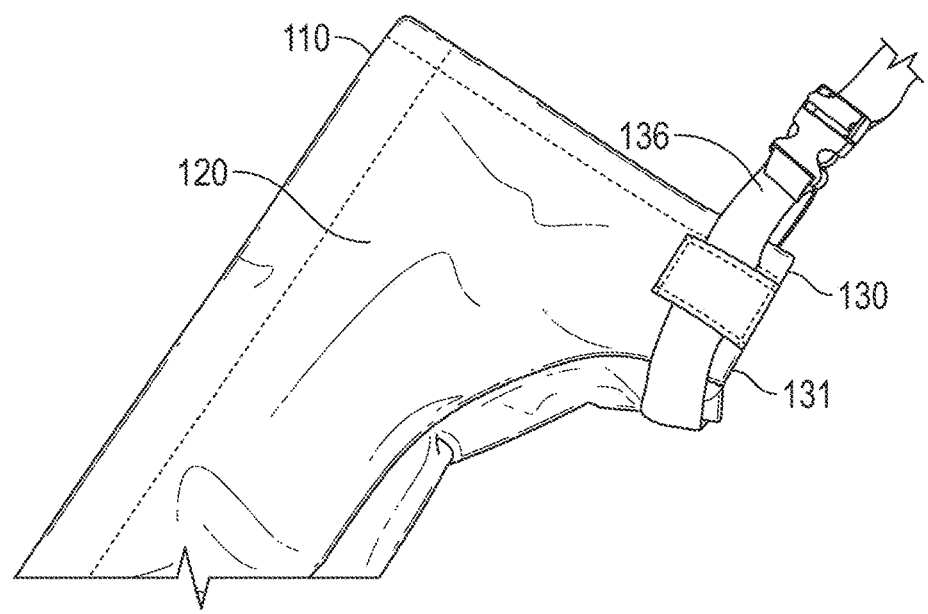
FIG. 12 is a close-up view of another portion of the sling of FIG. 9.
Figure 13:
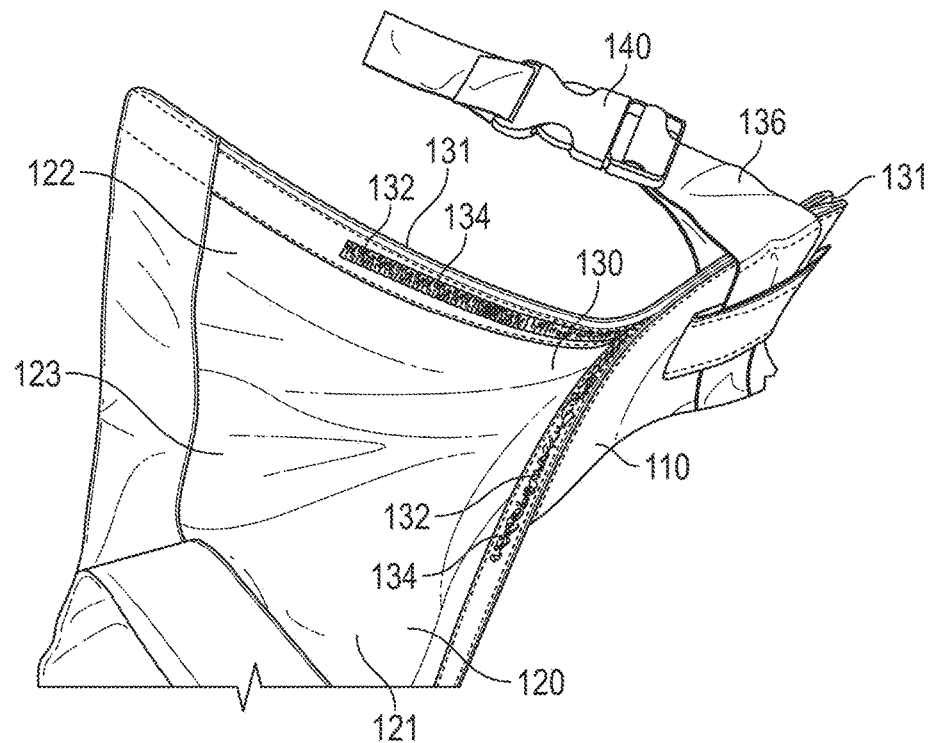
FIG. 13 is a close-up view of the portion of FIG. 12 in an open configuration.

FIG. 7 shows the sling 46 in an open configuration while FIG. 8 shows the sling in a closed configuration. The two configurations show that, in implementations, the attachment points 50 and couplers 48 of the first flap 52 align with the attachment points 50 and couplers 48 of the second flap 54. When the sling is in the closed configuration and the hose is passed therethrough, the hose resides between the first flap and the second flap. As can be seen from FIGS. 6 and 15, between the opening 82 and end of the hose coupled with a dispenser 102, during use the hose is coupled with the rigid holder only through the flexible sling 46.

FIG. 6 shows that a tightening member 60 may be included in the sling and may be used to adjust the size of the entrance opening 56 and/or to secure the hose and/or entrance end of the sling at a desired position relative to the substantially vertical section of the rigid holder. In implementations the tightening member 60 is a strap 62, such as a cloth, polymer or leather strap, and may be tied around the substantially vertical section to couple the sling and/or hose thereto. The strap may be included in the sling, such as sewn thereon, or may loosely reside within a channel sewn onto the sling, or it may not be attached or coupled directly to the sling at all but may instead be wrapped around the hose and the substantially vertical section to bring the hose within a desired proximity of the substantially vertical section, though in such an implementation the strap may not serve to adjust the size of the entrance opening 56.

The hose holder 44 may include a reinforcement member 74 coupled to the substantially vertical section and/or the substantially horizontal section of the rigid holder 68, as seen in FIG. 8, to reinforce the rigid holder 68 and provide it with increased rigidity and/or stability during use and/or storage. In implementations the reinforcement member 74 is a rigid rod. In various implementations, the rigid holder 68 is a metallic rod or a hollow metallic tube, though in implementations it could be formed of a polymer, a composite material, or the like.

Referring now to FIGS. 9-14, an implementation of a sling 110 is shown. Sling 110 is formed of a flexible material 111, as disclosed with respect to other slings herein. Sling 110 includes a first flap 120, which is a flexible flap 121, and a second flap 122 which is a flexible flap 123. An entrance opening 124 is included for the hose 148 to enter, and an exit opening 130 is included for the hose to exit. The entrance opening 124 is at least partially defined by a slit 125 and the exit opening 130 is also at least partially defined by a slit 131.

The first flap and second flap of sling 110 each include couplers 112 at attachment points 114, and the couplers 112 may be used to couple the sling or hang the sling from a substantially horizontal section of a rigid holder, as described herein with respect to other slings. A channel 116 may be present at the edge of each flap proximate the attachment points 114 and a support member 118, such as a rigid rod 119 (which may be a metallic or composite rod), may be inserted into each channel to provide increased support for the sling 110. In implementations the couplers 112 will be attached or coupled to the support members 118, or at or around the support member 118, so that it is generally the support members 118 that support the first flap and second flap (and therefore the hose), and the couplers in turn support the support members 118. This may allow the weight of the hose to be more evenly distributed along the sling.

An entrance adjuster (adjuster) 126 is included and is used to adjust the size of entrance opening 124, and similarly an exit adjuster (adjuster) 132 is included and is used to adjust the size of exit opening 130. The adjusters 126 and 132 in the implementations shown are formed of hook and loop fasteners 128 and 134, respectively, though in other implementations other elements could be used, such as snaps or buttons, a zipper, magnets, ties, or the like.

A number of tightening members 136 are included. These may be used, in implementations, both to assist in adjusting (or in holding a desired adjustment) of the size of the entrance and/or exit openings, and/or to couple the sling with a the substantially vertical section 152 of a rigid holder 150. Each tightening member 136 in the implementation shown includes a strap 138 and a side release buckle 140, and each strap 138 is woven through a channel 146 accessible through openings 144 defined by a retainer 142 which holds the strap in a position relative to the sling. Other types of buckles could be used, or buckles could be excluded in some instances, for example a number of ties such as tightening members 60 (shown in FIG. 6) could be used instead of straps with buckles, or straps with hook and loop fasteners could be used, or straps with snaps or buttons or other closure/tightening members. In some implementations the tightening members could be excluded entirely. The retainers 142 shown in FIG. 9 each have corresponding retainers 142 on the other side of the sling (on the other flap).

Figure 14:
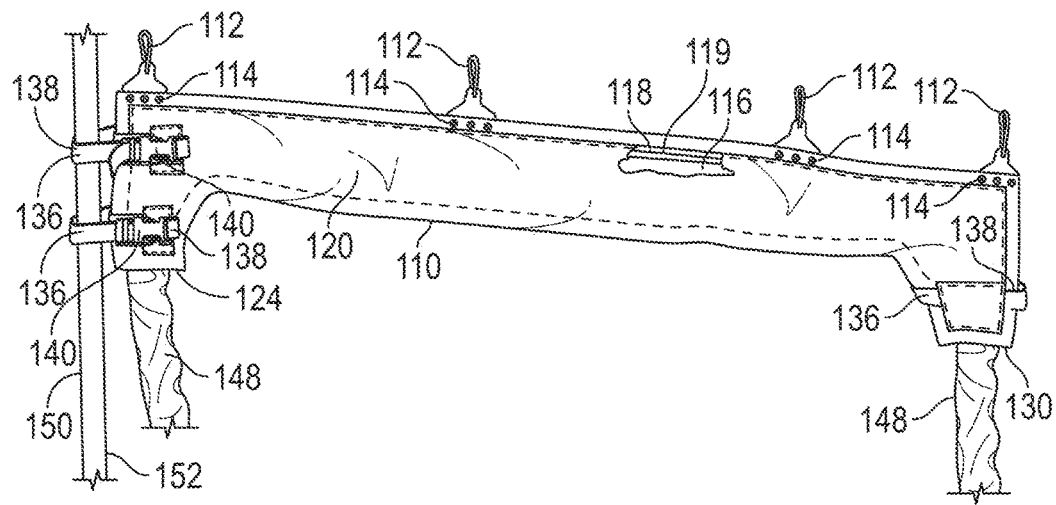
FIG. 14 is a side view of the sling of FIG. 9 shown coupled with a substantially vertical section of a rigid holder and with couplers attached to the sling at attachment points to couple the sling to a substantially horizontal section of the rigid holder.
Figure 15:
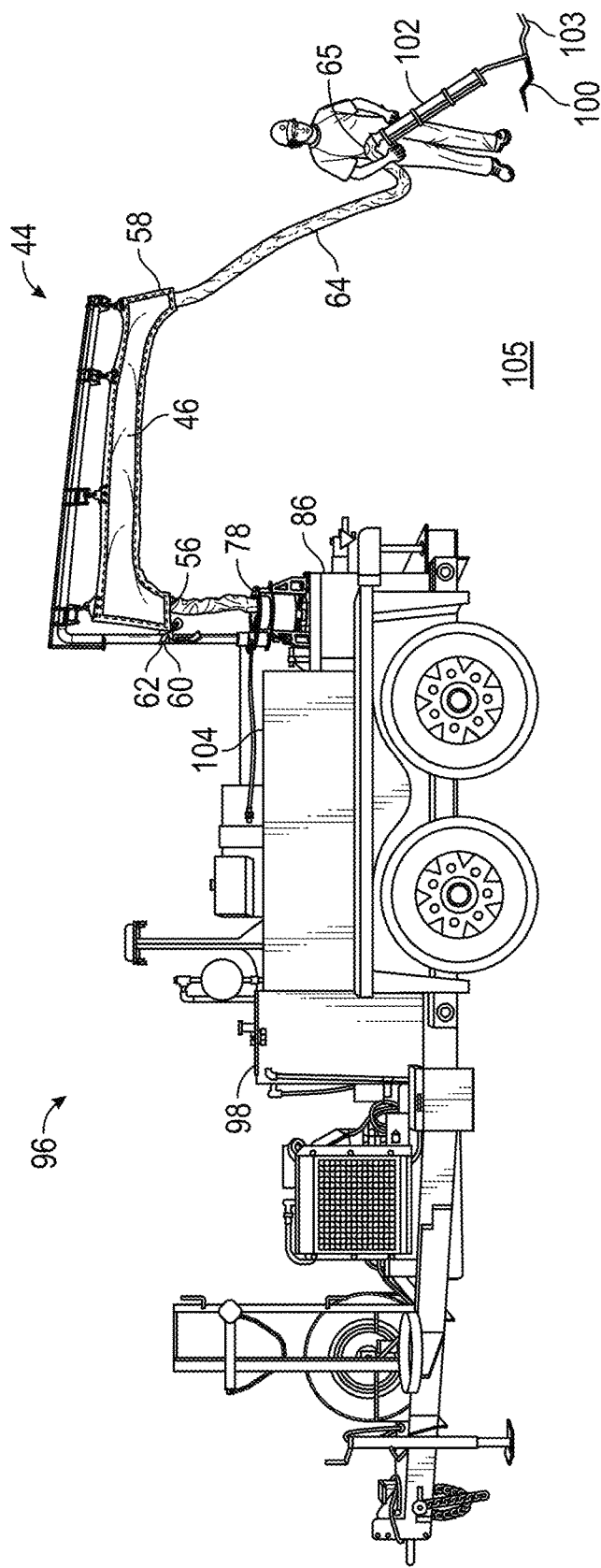
FIG. 15 is a side view of the hose holder system of FIG. 5 being used for a crack-filling process.

As shown in FIG. 14 the hose 148 extends substantially vertically upwards towards the entrance opening 124 from an opening of a swiveling member, in a direction that is substantially parallel with, or parallel with, a longest length of the substantially vertical section 152, and the hose then makes a bend within the sling 110, which in implementations is a 90 degree or an about 90 degree bend, and then is substantially horizontal (or parallel with the substantially horizontal section) until it exits the sling. The exit angle shown in FIG. 14 is another 90 degree angle, though sling 110 may be adjusted, using the adjusters 132 and/or tightening member 136, so that the hose 148 exits at an exit angle that is between about 30 and about 35 degrees, between 30 and 35 degrees, about 30 degrees, about 35 degrees, 30 degrees, or 35 degrees, as desired and as shown and described with respect to other slings.

In implementations, as can be seen from the drawings, the hose holder systems described herein provide a mechanism to support a hose that does not involve the hose coming into contact with any rigid portions of the hose holder system. This may allow the life of the hose to be extended and may prevent damage to the hose that could occur when the hose is brought into contact with rigid elements. As can be seen, the hose in implementations does not contact any portion of the swiveling base, but instead extends upwards therethrough without contacting the inner walls defined by the inner cylinder. The hose does not contact any portion of the rigid holder, and instead, from the attachment point where the hose attaches to the container or tank holding the heated or melted liquid, all the way to the dispenser 102, the hose holder systems are designed so that the hose is not coupled with any portion of the hose holder system except through the flexible sling. There is thus no rigid portion of any of the hose holder systems disclosed herein which contact the hose, between the attachment point and the dispenser, during use. Additionally, no metal portion of any of the hose holder systems disclosed herein contacts the hose, between the attachment point and the dispenser, during use. Thus the hose is not impacted, abraded, rubbed, chafed, scuffed, worn, eroded, damaged, torn, or the like, with any rigid or metallic element of the hose holder system, during use or storage. As can be seen from the images, there are no bolt clamps, metal rings, rigid brackets, rigid braces, rigid fittings, or any portion of the rigid holder itself which come into contact with the hose at any point during operation of the hose holder system.

The hose holder systems disclosed herein also provide for quick installation and removal of the hose into and from the sling. During installation of the hose, once the end 65 is inserted into the entrance opening (when the sling is in the closed configuration), the hose may simply be pushed through at the entrance end of the sling without providing any manual force anywhere else on the hose, and the hose will advance until the end 65 it exits the exit opening. Likewise, when it is desirable to remove the hose from the sling, the hose may be pulled upon at the entrance end and the hose may be withdrawn from the sling, through the entrance opening, without providing any manual pressure or force on any other portion of the hose. Thus a single user may easily and quickly install and uninstall the hose while standing in a single position and without having to move away from the position and/or without having to move to another position along the sling or along the rigid holder and without having to unbolt or bolt any fasteners, adjust any clamps, and so forth.

As disclosed to some extent herein, the heated liquid which is conveyed using the hose may be a crack repair liquid, such as an asphalt repair liquid, or the like. The hose itself may be heated and may include a variety of layers to provide electrical heating elements, electrical and/or thermal insulation, internal wiring, internal sensors, anti-kinking elements (such as a metal braid layer), and the like as disclosed herein.

In implementations the swiveling base is formed of steel and openings therein are weld-cut and/or portions are coupled together with welding. In implementations the rigid holder is formed of a steel tube having a substantially horizontal section of, or of about, 60 inches in length.

Referring to FIG. 6, in implementations a pair of stiffeners 156 is coupled to the substantially horizontal section of a rigid holder at every location where there is a coupler receiver. The stiffeners in implementations are formed of ⅜ inch thick steel plate and may be formed, with an opening matching the diameter of the substantially horizontal section, using a water jet or plasma cutting process, and are positioned so that the largest planar surface of the plate is substantially perpendicular to a longest length of the substantially horizontal section. These may be welded in place or otherwise secured. In implementations, as can be seen in FIG. 8, the reinforcement member may pass through an opening in each stiffener 156, and may also be welded to each stiffener proximate the opening, or otherwise secured.

In implementations the entrance angle and exit angle may be stitched or shaped into the sling or, in other words, provided for using the stitching or shape of the sling. For example, referring to FIG. 6, it may be seen that the about 90 degree entrance angle is provided for, or is accomplished, using the shape of the sling that is determined by how the flaps are stitched together to form an about 90 degree angle within the sling itself. Likewise, the about 30-35 degree exit angle shown in FIG. 6 may be provided for, or is accomplished, by how the exit ends of the two flaps are stitched together to form an exit that tends to force the hose into an about 30-35 degree exit angle. Similar elements tending to cause the hose to bend at desired angles may be designed or integrated within or proximate the entrance openings and exit openings of any of the other slings disclosed herein, including sling 110.

The inner cylinders and outer cylinders described herein may be formed of steel tubing. Various components of the rotating base may be welded together, bolted, or otherwise secured together as will be understood by the practitioner of ordinary skill in the art.

Any of the adjusters described herein, such as entrance adjusters and exit adjusters, may be used to selectively fix or secure the entrance angle and/or exit angle of the hose at a desired angle, and accordingly may be adjusted to alter the angle when desired. In all of the hose holder systems disclosed herein the sling is movably coupled with the substantially horizontal section with couplers such that the sling has some freedom of movement from side to side or, in other words, may swing back and forth about an axis parallel with a longest length of the substantially horizontal section, and may rock back and forth also to some extent along a direction substantially parallel with the longest length of the substantially horizontal section, such that the sling has some freedom of motion which may allow the sling to accommodate movement of the hose during use while the hose is being moved about by a user while dispensing fluid from the hose into a crack, by non-limiting example.

In implementations of hose holder systems a rigid holder includes, coupled with a substantially horizontal section of the rigid holder, a flange. In implementations the flange extends the full length, or substantially the full length, of the substantially horizontal section, though in other implementations it could extend less than the full length. In implementations the flange further extends along a portion of the substantially vertical section, though in other implementations it could extend only along the substantially horizontal section.. In implementations the flange extends more than half of the length of the substantially vertical section, or approximately ⅔ the length of the substantially vertical section, or the full length of the substantially vertical section, or substantially the full length of the substantially vertical section. The flange may be a flat rigid element, such as formed with metal (and may be welded or otherwise coupled with the rigid holder). The flange may have a thickness, in a plane coplanar with a plane containing the longest lengths of both the substantially vertical section and substantially horizontal section, which is the same thickness, or about the same thickness, as the rigid holder itself—though in other implementations it could have a thickness in this plane larger or smaller than that of the rigid holder. The flange may have a thickness in a transverse direction, transverse to a plane containing the longest lengths of both the substantially horizontal and substantially vertical sections, of less than half the thickness of the substantially horizontal section in this same transverse direction.

The flange includes a number of openings from which a coupler, such as a carabiner, can be hung. In implementations the openings are slots each having a longest length that is parallel with a longest length of the substantially horizontal section to give the sling some leeway along that same direction when the sling is coupled thereto, such as with a carabiner or other coupler. The sling includes a pair of channels, one at the top of each flap, each if which extends the full length of the sling. Into each channel a rigid rod is inserted. In one or more places along the channel there may be an opening in the channel along the length of the channel so that a corresponding opening in the rigid rod may be used to couple the rigid rod to the opening or slot in the flange, or to otherwise couple the rigid rod to the substantially horizontal section, as previously described, such as with a carabiner or other coupling member. The rigid rod in implementations is a cylindrical rod, though in other implementations it is a flat element having a cuboidal shape, such as a long flat rectangular cuboid. Each rigid rod, when in place within the channel, may extend beyond the ends of the channel on both ends of the sling, and may accordingly have one or more openings in a portion of the rigid rod that extends outside of the channel to couple the rigid rod to the flange and/or the substantially horizontal section as described above. In such an implementation, the rigid rods support the full weight of the sling and hose, while the carabiners or other coupling members support the rigid rods.

Another implementation similar to this but slightly different is one in which the flange is excluded, one of the channels of one of the flaps is sized to slide directly over the substantially horizontal member, and the other flap is configured to be coupled to the substantially horizontal member and/or to the upper end of the flap that is slid over the substantially horizontal member. In such implementations a rigid rod may still be inserted in the channel of the flap that does not slide over the substantially horizontal member, and coupling members such as those previously described may be used to couple the rigid rod with the substantially horizontal member, such as through one or more openings in the channel of the flap that is slid over the substantially horizontal member, using openings in the substantially horizontal member itself, or simply coupling over the top of the substantially horizontal member. In other implementations, the flange may be included and the channel of one flap may be sized to slide over the substantially horizontal member and the flange, and the other flap may include a rigid rod in a channel and the rigid rod may be coupled with the flange through openings in channels in both flaps, such as using a carabiner or other coupling element.

In still other implementations the substantially horizontal member could simply include two substantially horizontal members, which could be parallel or substantially parallel relative to one another and parallel or substantially parallel to the ground, and the channel of each of the flap could be slid over one of the substantially horizontal members. In such implementations there could be no openings in the channels apart from those at one or both ends of the sling. Elements may be used to prevent the sling from sliding back and forth more than desired along the longest length of the substantially horizontal member, in such an implementation. In implementations in which a flange is used the flange may provide increased rigidity to the rigid holder and may, therefore, fulfill the role of the aforementioned reinforcement member(s), in addition to providing a coupling mechanism for the sling.

In places where the description above refers to particular implementations of hose holder systems and related methods and implementing components, sub-components, methods and sub-methods, it should be readily apparent that a number of modifications may be made without departing from the spirit thereof and that these implementations, implementing components, sub-components, methods and sub-methods may be applied to other hose holder systems and related methods.

What is claimed is:

1. A hose holder system, comprising:
   a wheeled vehicle comprising a melter configured to melt a crack repair material;
   a hose coupled with the melter through an attachment point and configured to convey the melted crack repair material;
   a dispenser coupled with an end of the hose and configured to dispense the melted crack repair material into a crack, and;
   a sling formed of a flexible material, the sling holding a portion of the hose in a position substantially parallel with a ground upon which the wheeled vehicle is resting:
   wherein the hose holder system comprises no rigid element that contacts the hose between an opening and the dispenser; and
   wherein the hose extends from the opening in a direction substantially perpendicular to the ground upon which the wheeled vehicle is resting.

2. The hose holder system of claim 1, wherein the sling is coupled with a rigid holder having a substantially horizontal section and a substantially vertical section.

3. The hose holder system of claim 1, wherein the sling is movably coupled with the substantially horizontal section through a plurality of couplers.

4. The hose holder system of claim 1, wherein the hose enters the sling at an angle (entrance angle) between 75 and 105 degrees and exits the sling at an angle (exit angle) between 20 and 50 degrees.

5. The hose holder system of claim 1, wherein the sling comprises an adjuster configured to adjust a size of one of an entrance opening of the sling where the hose enters the sling and an exit opening of the sling where the hose exits the sling.

6. The hose holder system of claim 1, wherein the sling comprises a support member comprising a rigid rod.

7. The hose holder system of claim 1, wherein the sling comprises a pair of flexible flaps.

8. A hose holder system, comprising:
   a wheeled vehicle comprising a melter configured to melt a crack repair material;
   a hose coupled with the melter through an attachment point and configured to convey the melted crack repair material;
   a dispenser coupled with an end of the hose and configured to dispense the melted crack repair material into a crack; and
   a rigid holder coupled to the hose, the rigid holder comprising a substantially vertical section and a substantially horizontal section, wherein a portion of the hose that extends along the substantially vertical section and the substantially horizontal section is substantially parallel to the substantially vertical section and the substantially horizontal section.

9. The hose holder system of claim 8, wherein the rigid holder is rotatable through a swiveling base, wherein the hose extends parallel with the substantially vertical section of the rigid holder towards the substantially horizontal section of the rigid holder through an opening in a swiveling base.

10. The hose holder system of claim 9, further comprising a sling coupled to the horizontal section of the rigid holder, wherein the sling extends parallel to a length the substantially horizontal section.

11. The hose holder system of claim 9, wherein the horizontal section is longer the vertical section.

12. The hose holder system of claim 9, wherein the vertical section is longer than the horizontal section.

13. The hose holder system of claim 8, wherein the hose holder system comprises no rigid element that contacts the hose between the opening and the dispenser.

14. A hose holder system, comprising:
- a wheeled vehicle comprising a melter configured to melt a crack repair material;
- a hose coupled with the melter through an attachment point and configured to convey the melted crack repair material, wherein the hose passes through a swiveling member configured to swivel in a plane substantially parallel with a ground upon which the wheeled vehicle is resting;
- a dispenser coupled with an end of the hose and configured to dispense the melted crack repair material into a crack; and
- a rigid holder directly coupled to an edge of the swiveling member, the rigid holder having a substantially horizontal section and a substantially vertical section.

15. The hose holder of claim 14, further comprising a sling formed of a flexible material coupled to the rigid holder, the sling holding a portion of the hose in a position substantially parallel with the ground upon which the wheeled vehicle is resting.

16. The hose holder system of claim 14, wherein the hose is configured to swivel at the attachment point through a swiveling mechanism at the attachment point.

17. The hose holder system of claim 14, wherein the sling comprises a support member comprising a rigid rod.

18. The hose holder system of claim 14, wherein the sling comprises a pair of flexible flaps.

19. The hose holder of claim 18, wherein one of a first flap of the pair of flexible flaps, a second flap of the pair of flexible flaps, and both the first flap of the pair of flexible flaps and the second flap of the pair of flexible flaps is removably coupled to the rigid holder.

* * * * *